(12) United States Patent
Fischer et al.

(10) Patent No.: US 9,504,951 B2
(45) Date of Patent: Nov. 29, 2016

(54) QUENCHING SYSTEM FOR COOLING AND CLEANING DUST-CONDUCTING CRUDE GASIFICATION GAS

(75) Inventors: Norbert Fischer, Lichtenberg (DE); Tino Just, Freiberg (DE); Manfred Jänig, Grünewald (DE); Manfred Schingnitz, Freiberg (DE); Heidrun Toth, Freiberg (DE)

(73) Assignee: SIEMENS AKTIENGESELLSCHAFT (DE)

( * ) Notice: Subject to any disclaimer, the term of this patent is extended or adjusted under 35 U.S.C. 154(b) by 268 days.

(21) Appl. No.: 14/345,151

(22) PCT Filed: Sep. 10, 2012

(86) PCT No.: PCT/EP2012/067618
§ 371 (c)(1),
(2), (4) Date: Mar. 14, 2014

(87) PCT Pub. No.: WO2013/037722
PCT Pub. Date: Mar. 21, 2013

(65) Prior Publication Data
US 2014/0345466 A1    Nov. 27, 2014

(30) Foreign Application Priority Data
Sep. 14, 2011 (DE) .................. 10 2011 082 690

(51) Int. Cl.
*B01D 47/02* (2006.01)
*B01D 47/06* (2006.01)
*C10K 1/08* (2006.01)

(52) U.S. Cl.
CPC ........... *B01D 47/024* (2013.01); *B01D 47/027* (2013.01); *B01D 47/06* (2013.01); *C10K 1/08* (2013.01); *B01D 2247/105* (2013.01)

(58) Field of Classification Search
CPC .. B01D 47/024; B01D 47/027; B01D 47/06; B01D 2257/105; C10K 1/08
USPC ......... 96/262, 278, 280, 329, 366, 367, 370; 48/128
See application file for complete search history.

(56) References Cited

U.S. PATENT DOCUMENTS

| 492,082 A | 2/1893 | Wright |
| 2,463,382 A | 3/1949 | Hobbs |

(Continued)

FOREIGN PATENT DOCUMENTS

| CN | 101003754 B | 7/2011 |
| DE | 10 2010 033 323 | 2/2012 |

(Continued)

OTHER PUBLICATIONS

Office Action dated Dec. 4, 2014 in corresponding Chinese Patent Application No. 201280044872.7 (with English language translation) (9 pages).

(Continued)

*Primary Examiner* — Frank Lawrence
(74) *Attorney, Agent, or Firm* — Ostrolenk Faber LLP

(57) ABSTRACT

Separation of dust in a quenching device arranged downstream of an entrained-flow gasification system is increased by a baffle with a double deflection system for deflecting the crude gas at approximately 180° angle. An additional spraying element is provided. The arrangement can be single-sided or double-sided, or can include an additional weir.

10 Claims, 4 Drawing Sheets

(56) References Cited

U.S. PATENT DOCUMENTS

| | | | |
|---|---|---|---|
| 2,818,326 A | 12/1957 | Du Bois | |
| 3,477,208 A | 11/1969 | Keller, Sr. | |
| 3,815,332 A * | 6/1974 | Bobrowsky | B01D 47/06 261/119.1 |
| 4,466,808 A * | 8/1984 | Koog | C10J 3/485 252/373 |
| 4,605,423 A * | 8/1986 | Koog | C10J 3/485 48/69 |
| 4,808,197 A * | 2/1989 | Ayers | C10J 3/485 110/171 |
| 5,122,168 A * | 6/1992 | Torres | B01D 47/027 55/434 |
| 5,976,203 A * | 11/1999 | Deeke | C10J 3/485 422/207 |
| 6,238,468 B1 * | 5/2001 | Nilsson | D21C 11/04 95/226 |
| 2011/0120009 A1 | 5/2011 | Klockow | |

FOREIGN PATENT DOCUMENTS

| | | |
|---|---|---|
| EP | 0168128 A2 | 1/1986 |
| WO | WO 9323502 A1 | 11/1993 |

OTHER PUBLICATIONS

Carl J. et al: Noell-Konversionsverfahren zur Verwertung und Entsorgung von Abfallen, EF-Verlag fur Energie-und Umwelttechnik GmbH, pp. 25-53, 1994; 1994.

International Search Report dated Jan. 16, 2013 issued in corresponding International Application No. PCT/EP2012/067618.

Written Opinion dated Jan. 16, 2013 issued in corresponding International Application No. PCT/EP2012-067618.

* cited by examiner

QUENCHING SYSTEM FOR COOLING AND CLEANING DUST-CONDUCTING CRUDE GASIFICATION GAS

CROSS-REFERENCE TO RELATED APPLICATIONS

The present application is a 35 U.S.C. §§371 national phase conversion of PCT/EP2012/067618, filed Sep. 10, 2012, which claims priority of German Patent Application No. 10 2011 082 690.4, filed Sep. 14, 2011, the contents of which are incorporated by reference herein. The PCT International Application was published in the German language.

TECHNICAL FIELD

The invention relates to a device for quenching and scrubbing crude gas in a gasification appliance.

TECHNICAL BACKGROUND

The invention relates to entrained flow gasification of differing ash-containing solid and liquid fuels with an oxidizing agent containing free oxygen at pressures up to 10 MPa and gasification temperatures up to 1900° C. Solid fuels in this case are coals of differing degrees of coalification milled to powder, petroleum cokes and other millable solids from the waste and recycling economy. Liquid fuels are taken to mean oils, oil-solids suspensions, and also coal-water suspensions, termed slurries.

In the technology of gas generation, autothermal entrained flow gasification has been known for many years. The ratio of fuel to oxygen-containing gasification agent is selected in this case such that temperatures are achieved which are above the melting point of pulverized fuel ash. Then, the ash is melted to give liquid slag, which leaves the gasification chamber together with the gasification gas and is then cooled.

An extensive description of the prior art with various designs of the quench system may be found in J. Carl inter alia, NOELL-KONVERSATIONSVERFAHREN, EF-VERLG für Energie-und Umwelt-technik GmbH 1996 [Noell Conversion process, ef-verlag für Energie-und Umwelt-technik GambH 1996]. The direct cooling of hot crude gasification gas and liquid slag described therein by injecting water in excess cools the crude gas to saturation temperature which is dependent on the gasification pressure. If the gasification pressure is, for example, 40 bar, the crude gas is cooled to approximately 210° C. and is steam-saturated. The slag that is cooled in the same manner collects in the water bath in the lower part of the quench chamber and is discharged, the steam-saturated crude gas leaves the quench chamber at the side and is fed to further purification stages, for example a Venturi scrubber for further dust separation. Quench water is provided in this case via a process water circuit to which process condensates and fresh water are supplied as makeup after the solids separation. The solutions of the prior art have the disadvantage that a considerable part of the solids that are entrained by the crude gas and consist of small slag particles and soot are not scrubbed out in this simple system and require the subsequent purification stages. The fine solids are in part transported through the entire process chain and lead to operating faults.

The object of the invention is to specify a device for quenching in a gasification appliance, which ensures safe cooling of the crude gasification gas and at the same time separates off a high proportion of the entrained dust and binds it in surplus water.

The crude gas generated with the device according to the invention exhibits a considerable reduction in the loading with particles.

The invention will be described in more detail hereinafter in 3 examples on the basis of 3 figures to an extent necessary for understanding.

DESCRIPTION OF EMBODIMENTS

Figure 1A:
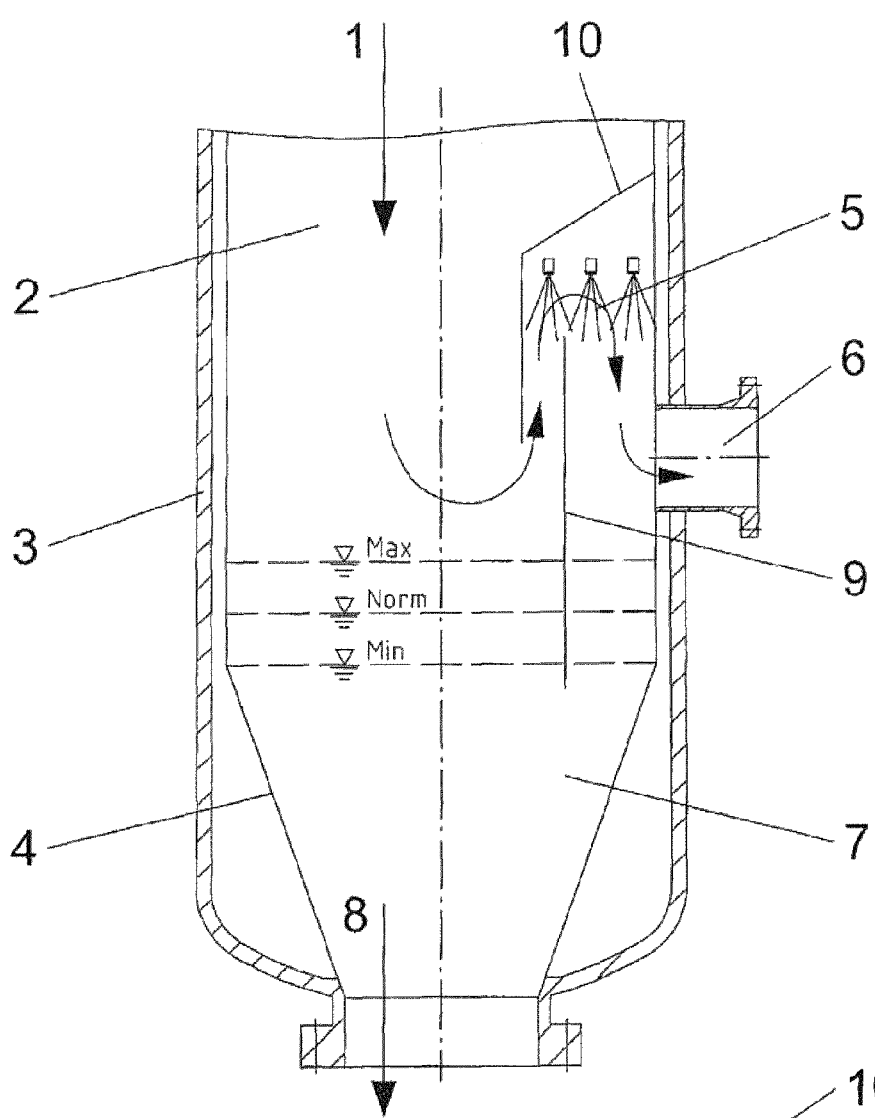
FIG. 1A shows an elevational sectional view and FIG. 1B shows a sectional view from the top of a device for dust separation via a baffle having a hood 10 and an inner dividing wall 9 having crude gas removal on one side.
Figure 1B:
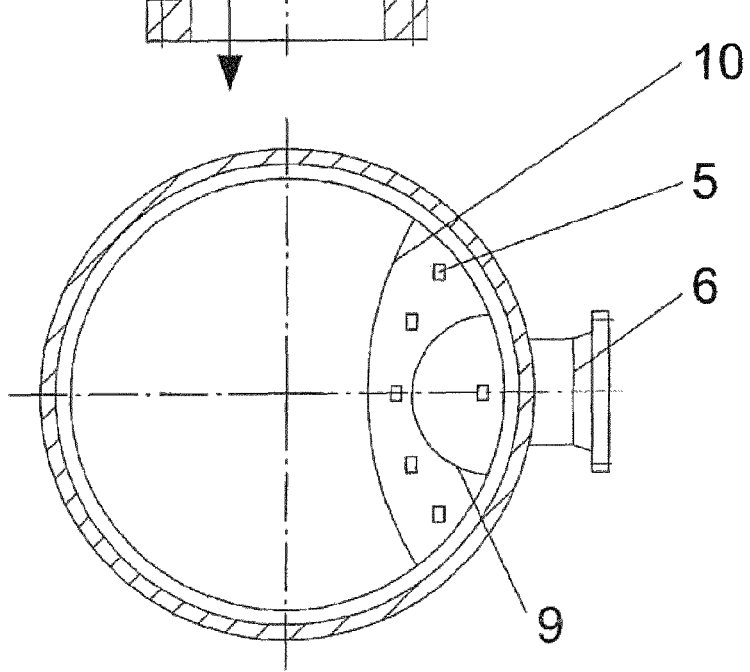

Example 1 according to FIGS. 1A and 1B:

In the figures, the same references denote the same elements.

In a gasification system having a power of 500 MW, 80 t/h of hard coal having an ash content of 9 Ma % are gasified in the gasification chamber 1a at temperatures of 1650° C. and a pressure of 42 bar. The amount of crude gas formed in this process of 130 000 $m^3(STP)/h$ in the gasification chamber passes here, together with the slag 1, into the upper part of the quench chamber (not shown here) and is sprayed with quench water from nozzle rings. In this process, the crude gas cools together with the slag to 210° C. Some of the quench water is evaporated during the cooling and scrubbing operation, in such a manner that the moist amount of crude gas increases to 230 000 $m^3(STP)/h$. In the lower part of the quench chamber 2 is situated the water bath 7 which is controlled in height between a minimum level (Min) and maximum level (Max). The quench chamber is surrounded by the pressure shell 3, the inner protective wall 4 serves for protection thereof. The crude gas is deflected upwards by the upper level of the water bath 7. Owing to the centrifugal force of the solid particles, a considerable part are introduced into the water bath via the deflection. These solids particles separated off are removed from the quench chamber via a removal 8 together with the excess water from the water bath 7.

A crude gas exit 6 is arranged above the maximum water level Max of the water bath 7. A dividing wall 9 is arranged upstream of the crude gas exit 6 in the quench chamber in such a manner that it terminates with the inner wall 4 of the quench chamber 2 on both sides of the crude gas exit 6. The bottom end of the dividing wall 9 is immersed beneath the minimum water level Min of the water bath 7 in such a manner that the volume delimited from the quench chamber by the dividing wall can communicate with the water bath. The volume delimited from the quench chamber by the dividing wall is open at the top. The cross sectional surface delimited from the quench chamber by the dividing wall is 5 to 10 percent, preferably 7 percent, of the entire cross sectional surface of the quench chamber 2. The top end of the dividing wall 9 juts out beyond the upper edge of the crude gas exit 6. The top end of the dividing wall 9 is canopied by a hood 10 in such a manner that it firstly terminates with the inner wall 4 of the quench chamber 2 and secondly the bottom edge of the hood ends beneath the top end of the dividing wall 9. The bottom end of the hood ends, for example, at the height of the middle axis of the crude gas exit 6. The hood falls towards the center of the quench chamber, which promotes slag to flow off. The hood therefore forms at the top a roof over the cross sectional surface separated off by the dividing wall in such a manner that immediate access of crude gas and slag from the top into the cross sectional surface separated off by the dividing wall is prevented.

The cross sectional surface delimited off from the quench chamber by the hood is 10 to 20 percent, preferably 15 percent, of the entire cross sectional surface of the quench chamber 2. In a particular embodiment, the cross sectional surface separated off by the dividing wall is half of the cross sectional surface separated off by the hood. In a preferred embodiment, the cross sectional surface separated off by the dividing wall is less than half of the cross sectional surface separated off by the hood.

The dividing wall 9 and the hood 10 together form a baffle, which forces the crude gas to change 180° in direction while entering the crude gas exit 6, which separates particles out of the crude gas and into the water bath 7.

The crude gas is deflected via the water surface of the water bath and in this process is dedusted. In addition, the crude gas flows upwards into the space formed from the hood 10 and the inner dividing wall 9. After a further deflection via the top end of the dividing wall, the scrubbed crude gas leaves the bottom part of the quench chamber 2 in a downwardly directed flow via the crude gas exit 6 and passes into further purification stages (not shown here).

The crude gas pathway is dimensioned such that the cross sectional surface separated off by the dividing wall is not smaller than the cross sectional surface of the crude gas exit 6 and the cross sectional surface between hood and dividing wall is not smaller than the cross sectional surface separated off by the dividing wall. The crude gas pathway therefore has at least the cross section of the crude gas exit 6 over the entire length thereof.

Beneath the hood, wash nozzles 5 are arranged, from which wash water is sprayed out downwards for cleaning the crude gas. The wash nozzles can be arranged above the top end of the dividing wall. A wash nozzle can be arranged in such a manner that it sprays wash water into the space between hood and dividing wall, that is to say against the ascending crude gas. A wash nozzle can be arranged in such a manner that it sprays wash water into the space separated off by the dividing wall, that is to say in the direction of the downwardly-flowing crude gas. If a plurality of wash nozzles 5 are arranged which spray wash water into the space between hood and dividing wall, they can be arranged distributed over the central spacing between dividing wall and hood. If the dividing wall and the hood have the shape of a respective circle segment, the wash nozzles 5 can be arranged in an arc shape.

The inner dividing wall 9 is open below towards the water bath 7 in order to be able to take up the wash water from the wash nozzles 5 and dust that has been separated off.

Figure 4:
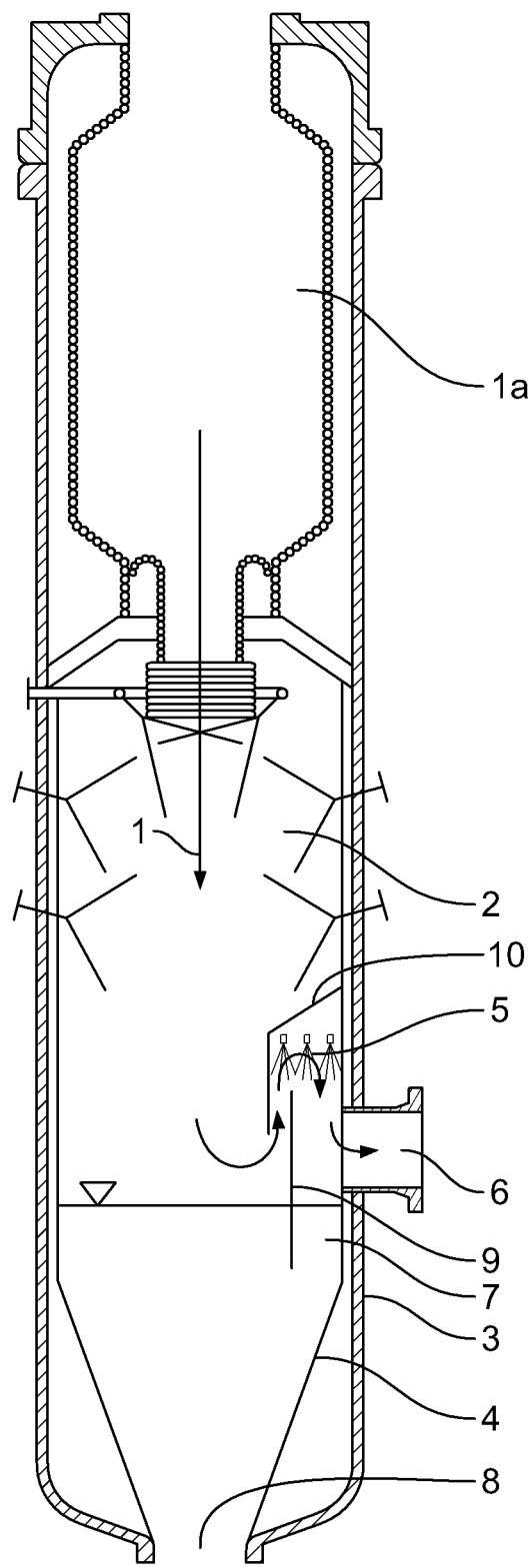
FIG. 4 shows a known entrained flow gasifier with a device for dust separation.

FIG. 4 illustrates an entrained flow gasifier known from published German patent application DE 102010033323, incorporated herein by reference. There is a gasification chamber in the upper part and beneath it a quenching chamber in the lower part. The present invention is an improvement in the area of the dividing wall 9 and hood 10 which together form a baffle, as was described above. Already known from that prior published application is a hood which partially covers the crude gas exit and a water injection providing moistening of the crude gas exit in order to avoid disposal of solid matter and for further cooling of hot crude gas streaks before they enter following equipment. The invention hereof concerns an improved hood, baffle and the accompanying water injection in the vicinity of the crude gas exit. Reference numbers in FIG. 4 correspond to those in FIG. 1A.

Figure 2A:
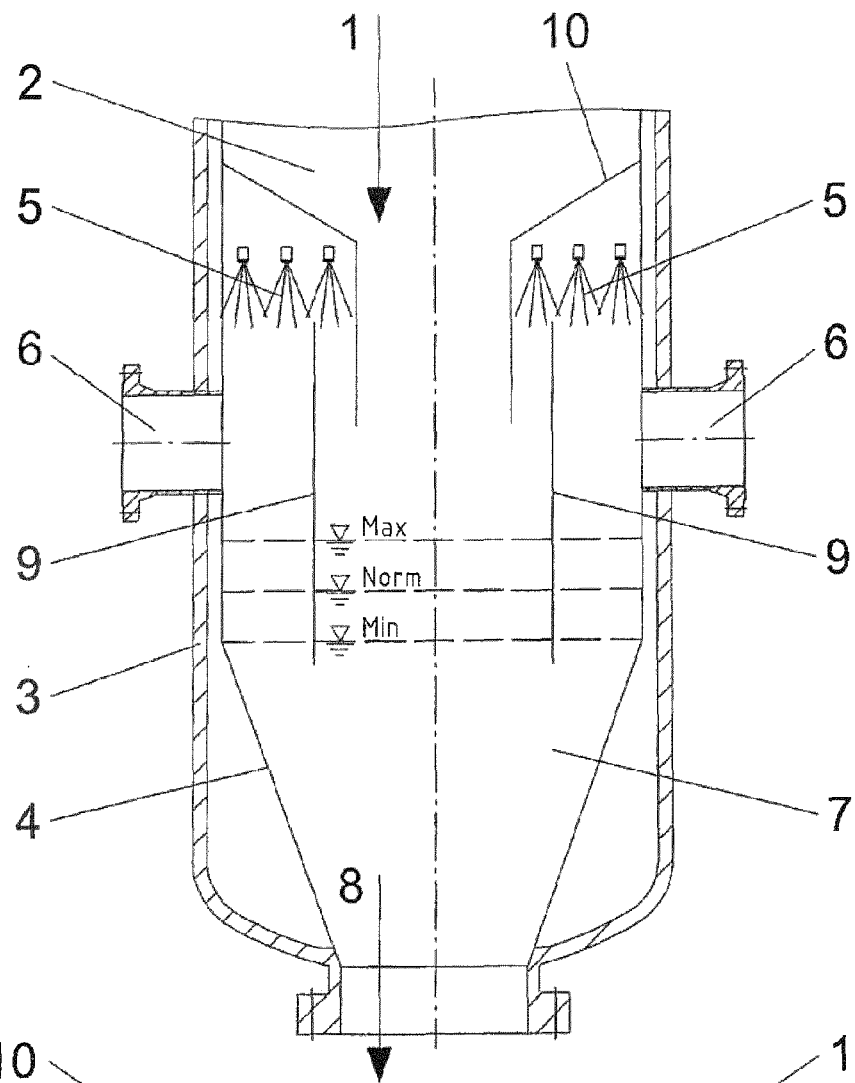
FIG. 2A shows an elevational sectional view and FIG. 2B shows a sectional view from the top of a device for dust separation via a baffle having a hood 10 and an inner dividing wall having double crude gas removal.
Figure 2B:
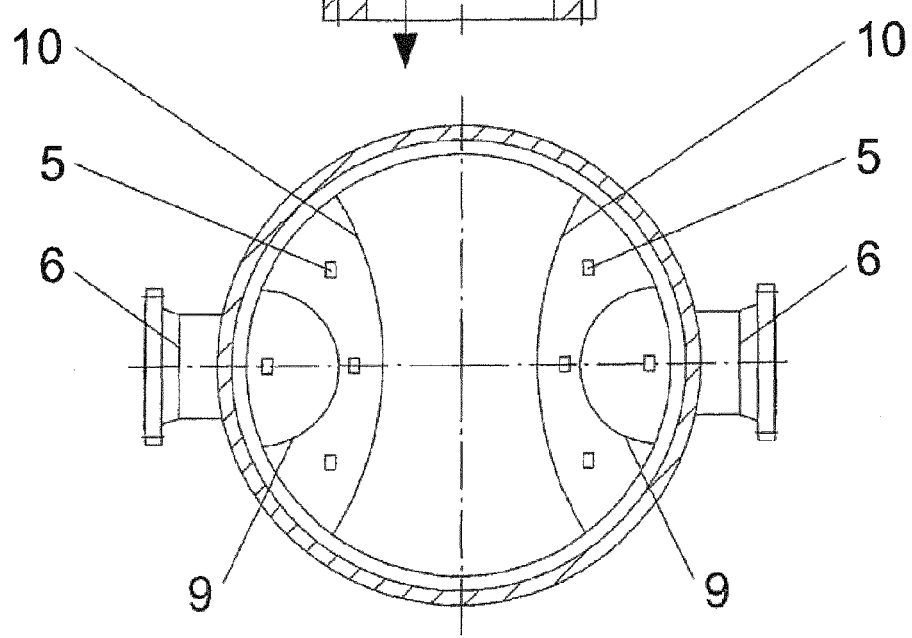

Example 2 according to FIGS. 2A and 2B:

The same conditions apply as in example 1 using elements of the same type classified by the same numbers. The baffle formed from inner dividing wall 9 and hood 10 as was described above in example 1 is here constructed in duplicate in a symmetrical shape, together with the crude gas exit 6. As a result, the flow velocities fall and the dust separation further improves. This is accompanied with a constriction in the lower part of the quench chamber 2.

Figure 3A:
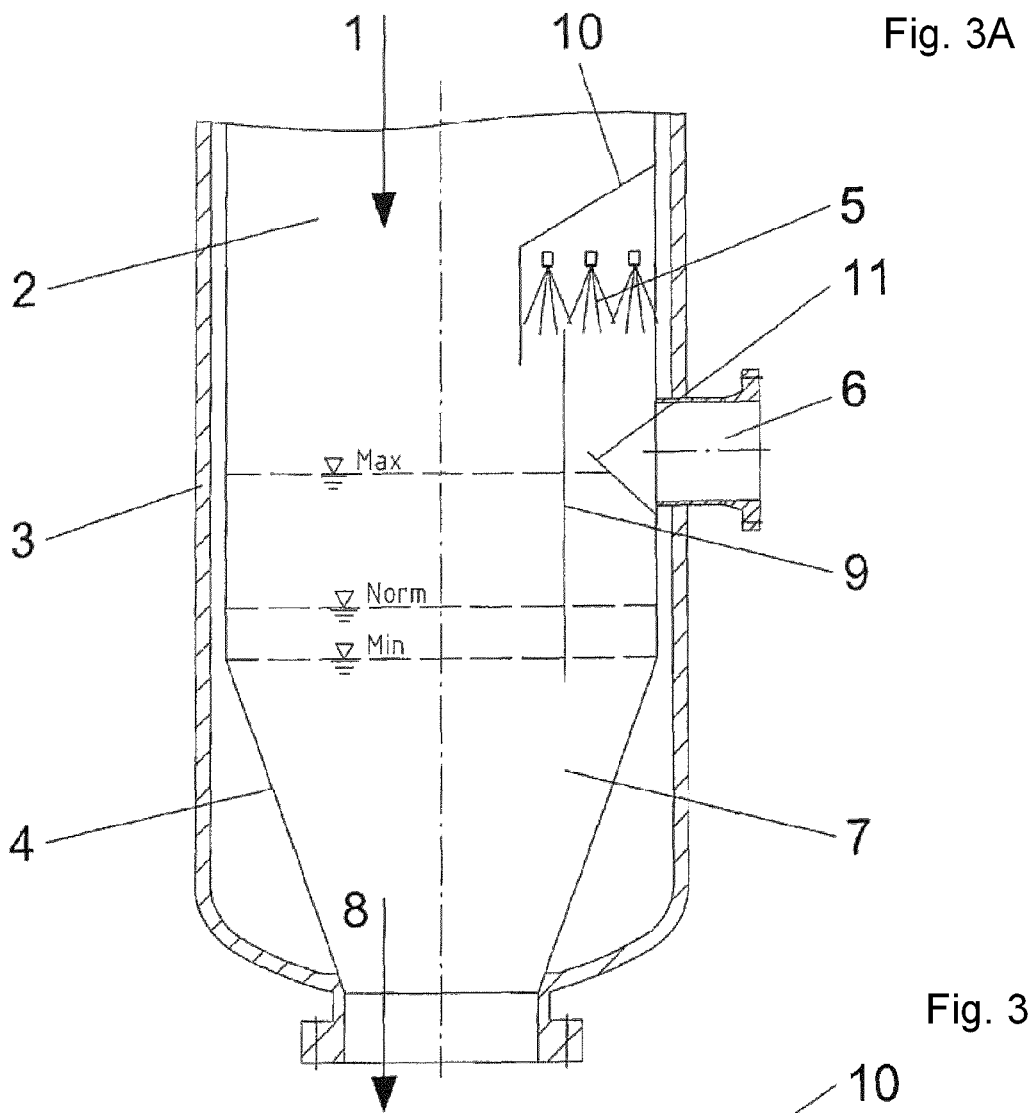
FIG. 3A shows an elevational sectional view and FIG. 3B shows a sectional view from the top of a device for dust separation having an additional weir.
Figure 3B:
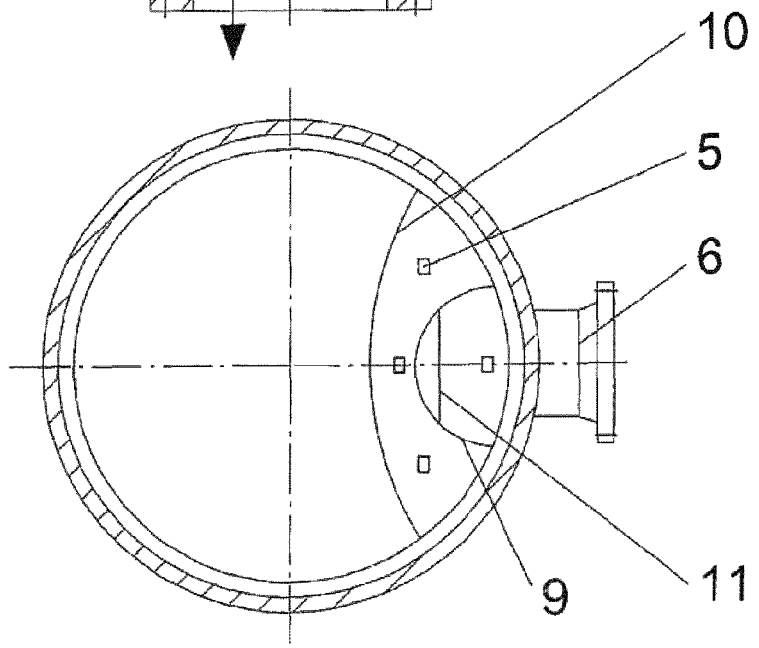

Example 3 according to FIGS. 3A and 3B:

The same conditions apply as in example 1 using elements of the same type classified by the same numbers. Owing to fluctuations in the operating pressure, relatively strong fluctuations of the maximum fill level in the water bath 7 can occur with the risk of carryover of solids-containing quench water from the water bath 7 via the crude gas exit 6 into downstream plant components. By means of the arrangement of the weir 11, the maximum fill level can be further increased and this risk of carryover reduced or prevented. In the cross sectional surface separated off by the dividing wall, a diaphragm 11 acting as a weir is arranged in such a manner that it terminates beneath the crude gas exit 6 with the inner wall of the quench chamber and rises towards the center of the quench chamber. The edges of the diaphragm terminate with the dividing wall on both sides of the crude gas exit. On the side of the diaphragm opposite to the crude gas exit, a gap to the dividing wall is left for pressure equilibration. The permissible maximal water level Max of the water bath can be above the lower edge of the crude gas exit and below the gap left by the diaphragm.

The volume delimited by the dividing wall or the space delimited by the dividing wall communicates at the bottom end of the dividing wall with the water bath and, at the top end of the dividing wall, with the quench chamber.

The invention also relates to a device for separating off entrained solids from a crude gas of the entrained flow gasification under pressure in a quench chamber downstream of the gasification chamber by injecting quench water in excess and cooling the crude gas to saturation temperature, in which the crude gas is forced by the arrangement of a hood 10 and an inner dividing wall 9 to a double change in direction by 180° and upstream of the crude gas exit 6 undergoes an improved solids separation.

In a particular development of the invention, the crude gas is additionally scrubbed by spraying 5 in the region of the second change in direction by 180°.

In a particular development of the invention, the inner dividing wall 9 has an open connection to the water bath 7.

In a particular development of the invention, the hood 10 is closed gas-tightly at the top.

In a particular development of the invention, the baffle consisting of hood 10 and inner dividing wall 9 is constructed in duplicate or many times, together with the crude gas exit 6.

In a particular development of the invention, a weir 11 is arranged with the advantage that the fill level of the water bath 7 can be increased.

The invention claimed is:

1. A device for separating off entrained solids from crude gas in an entrained flow gasification appliance that is operated at many times atmospheric pressure, the device comprising the gasification appliance having a gasification chamber, and a quench chamber downstream of the gasification chamber, the quench chamber being configured for injection of quench water in excess to cool the crude gas to saturation temperature, the quench chamber comprising:
   a dividing wall which is arranged upstream of a crude gas exit, in and through an inner wall of the quench chamber, the dividing wall extending circumferentially past the crude gas exit and terminating at the inner wall of the quench chamber on both sides of the crude gas exit;
   the dividing wall being shaped to define an opening at the top end and at the bottom end thereof into the quench chamber;
   the bottom end of the dividing wall being configured to be immersed in a water bath at the bottom of the quench chamber;
   the top end of the dividing wall being located higher than an upper edge of the crude gas exit; and
   the dividing wall extends parallel to a longitudinal axis of the quench chamber, an inlet of the quench chamber for the crude gas and an outlet of the quench chamber for water from the water bath being configured to allow crude gas to flow into the quench chamber and water to flow out of the quench chamber in a direction parallel to the longitudinal axis of the quench chamber; and
   a hood at the top end of the dividing wall which defines a canopy over the open top end of the dividing wall; and
   the hood has a bottom edge that is lower than the top end of the dividing wall, such that the crude gas is deflected upwards by the surface of the water bath at the bottom of the quench chamber, the gas ascends into the space between the hood and the dividing wall, particles are separated off into the water bath, and the crude gas is deflected to flow downwards via the top end of the dividing wall and then leaves the crude gas exit.

2. A device for separating off entrained solids from crude gas in an entrained flow gasification appliance that is operated at many times atmospheric pressure, the device comprising the gasification appliance having a gasification chamber, and a quench chamber downstream of the gasification chamber, the quench chamber being configured for injection of quench water in excess to cool the crude gas to saturation temperature, the quench chamber comprising:
   a dividing wall which is arranged upstream of a crude gas exit, in and through an inner wall of the quench chamber, the dividing wall extending circumferentially past the crude gas exit and terminating at the inner wall of the quench chamber on both sides of the crude gas exit;
   the dividing wall being shaped to define an opening at the top end and at the bottom end thereof into the quench chamber;
   the bottom end of the dividing wall being configured to be immersed in a water bath at the bottom of the quench chamber; and
   the top end of the dividing wall being located higher than an upper edge of the crude gas exit;
   a hood at the top end of the dividing wall which defines a canopy over the open top end of the dividing wall; and
   the hood has a bottom edge that is lower than the top end of the dividing wall, such that the crude gas is deflected upwards by the surface of the water bath at the bottom of the quench chamber, the gas ascends into the space between the hood and the dividing wall, particles are separated off into the water bath, and the crude gas is deflected to flow downwards via the top end of the dividing wall and then leaves the crude gas exit; and
   at least one wash nozzle beneath the hood and configured for spraying out wash water for cleaning the crude gas.

3. The device as claimed in claim 2, wherein the at least one wash nozzle is arranged above the top end of the dividing wall.

4. The device as claimed in claim 1, wherein a crude gas pathway from the quench chamber to the crude gas exit has at least an area of a cross-section of the crude gas exit.

5. A device for separating off entrained solids from crude gas in an entrained flow gasification appliance that is operated at many times atmospheric pressure, the device comprising the gasification appliance having a gasification chamber, and a quench chamber downstream of the gasification chamber, the quench chamber being configured for injection of quench water in excess to cool the crude gas to saturation temperature, the quench chamber comprising:
   a dividing wall which is arranged upstream of a crude gas exit, in and through an inner wall of the quench chamber, the dividing wall extending circumferentially past the crude gas exit and terminating at the inner wall of the quench chamber on both sides of the crude gas exit;
   the dividing wall being shaved to define an opening at the top end and at the bottom end thereof into the quench chamber;
   the bottom end of the dividing wall being configured to be immersed in a water bath at the bottom of the quench chamber; and
   the top end of the dividing wall being located higher than an upper edge of the crude gas exit;
   a hood at the top end of the dividing wall which defines a canopy over the open top end of the dividing wall; and
   the hood has a bottom edge that is lower than the top end of the dividing wall, such that the crude gas is deflected upwards by the surface of the water bath at the bottom of the quench chamber, the gas ascends into the space between the hood and the dividing wall, particles are separated off into the water bath, and the crude gas is deflected to flow downwards via the top end of the dividing wall and then leaves the crude gas exit,
   wherein the hood is inclined downward toward a center of the quench chamber inward from the inner wall of the quench chamber.

6. The device as claimed in claim 1, further comprising a diaphragm arranged in a cross sectional surface separated off by the dividing wall in such a manner that the diaphragm
   terminates beneath the crude gas exit and terminates toward the inner wall of the quench chamber;
   rises upward from the inner wall and also extends toward the center of the quench chamber;
   terminates at and with the dividing wall on both circumferential sides of the crude gas exit; and
   leaves a gap to the dividing wall on the side facing toward the crude gas exit.

7. The device as claimed in claim 1, further comprising a plurality of the crude gas exits arranged at intervals around the circumference of the quench chamber.

8. The device as claimed in claim 2, wherein the wash nozzle is arranged perpendicularly over the channel for the ascending crude gas and between the hood and the dividing wall.

9. The device as claimed in claim 2, wherein a wash nozzle is arranged perpendicularly over the channel delimited by the dividing wall for the downwardly-flowing crude gas.

10. The device as claimed in claim 2, wherein the at least one nozzle, hood and dividing wall are all arranged to force the crude gas to the water bath in the quench chamber to cause a 180° change in direction of the crude gas and to aid in solids separation from the crude gas.

\* \* \* \* \*